United States Patent [19]

Dovel

[11] 4,169,792
[45] Oct. 2, 1979

[54] WATER INTAKE DEVICE

[76] Inventor: William L. Dovel, 1109 N. Broadway, Yonkers, N.Y. 10701

[21] Appl. No.: 841,846

[22] Filed: Oct. 13, 1977

[51] Int. Cl.² .............................................. B01D 23/24
[52] U.S. Cl. ...................................... 210/82; 210/108;
210/158; 210/159; 210/393; 210/411; 210/427
[58] Field of Search ................. 119/5; 210/65, 78, 79,
210/81, 82, 106, 108, 153, 156–159, 169, 359,
391, 393, 409, 411, 412, 416 R, 416 AS, 420,
425, 426, 427

[56] References Cited

U.S. PATENT DOCUMENTS

| 3,029,948 | 4/1962 | McKay | 210/412 |
| 3,241,676 | 3/1966 | Neuville et al. | 210/82 |
| 3,337,000 | 8/1967 | Coleman | 210/158 |
| 3,843,520 | 10/1974 | Bottorf | 210/393 |
| 4,053,413 | 10/1977 | Miller | 210/158 |

Primary Examiner—Frank Sever
Attorney, Agent, or Firm—Cooper, Dunham, Clark, Griffin & Moran

[57] ABSTRACT

A water intake device comprising a substantially cylindrical rotatable screen adapted to be at least partially submerged in a body of water, means for rotating said screen, a water supply conduit communicating with the interior of said screen to receive water flowing through said screen, means for backwashing a section of said screen as said screen moves by said backwashing means so as to clear and/or remove objects or fish caught on the exterior surface of said screen and duct means associated with said backwashing means to provide or define a flow channel or path to guide and/or carry the objects or fish away from the influence or suction of the water entering said screen to said water supply conduit.

17 Claims, 5 Drawing Figures

U.S. Patent Oct. 2, 1979 Sheet 2 of 2 4,169,792
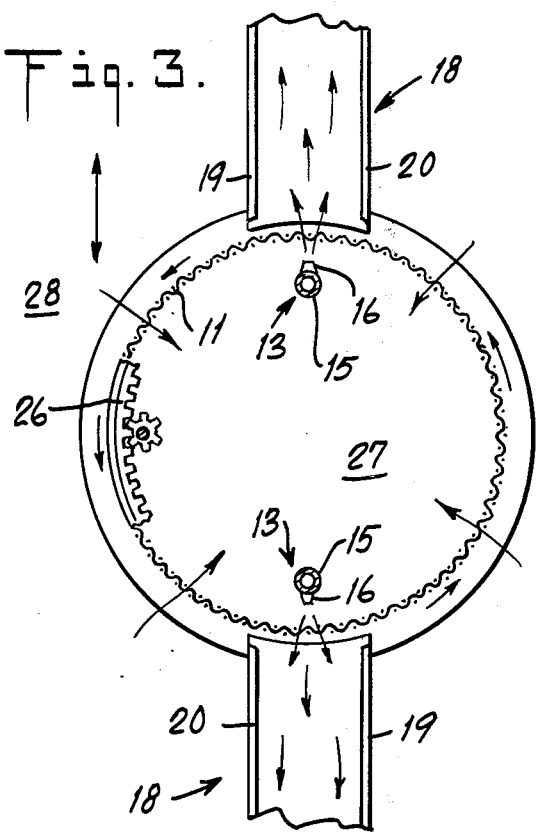
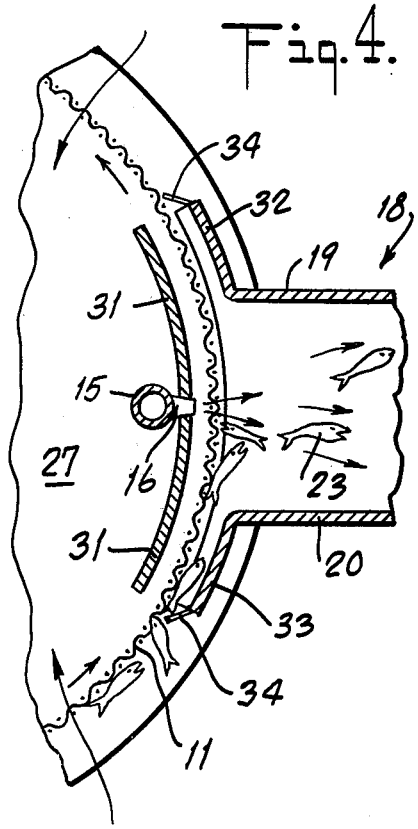
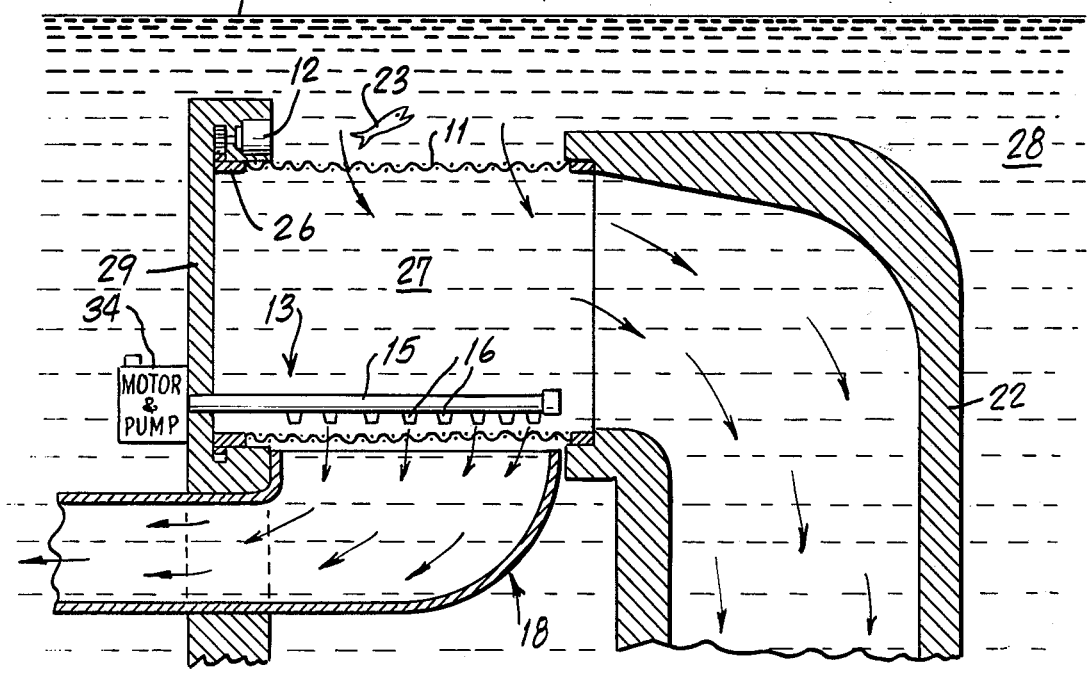

WATER INTAKE DEVICE

SUMMARY AND BACKGROUND OF THE INVENTION

Water from seas, inlets, rivers, lakes and other bodies of water can be used in a variety of different ways, for example, as coolant in power plant operation. Some thermal and nuclear power plants are located near bodies of water which shelter large numbers of fish or which serve as breeding and nursery grounds for fish. When small fish hibernate or when fish spend their juvenile period in these bodies of water and when these bodies of water are used to supply cooling water to nearby power plants, fish in the water are easily sucked or pulled into the cooling water intake pipes of the power plants. This situation produces problems, e.g. the clogging of the screens of the cooling water intakes of the power plant and death of the fish.

To prevent screen clogging and/or fish kill, various techniques and screens have been proposed or used to prevent the fish from entering the cooling water intake conduit of a power plant. It appears that a screen alone or a screen provided with a backwash device is not sufficient. When fish are immature or wintering, they cannot avoid the pull or suction of the intake conduits and become caught on the intake conduit screen, not only resulting in a clogged screen and preventing water from entering the power plant but also resulting in the fish being killed due to entrapment on the screen. A jet of water directed against the screen only momentarily releases the fish from the screen since the suction of the water flowing through the screen into the supply conduit again siezes the fish and returns them to the screen.

A water intake device in accordance with this invention comprises a movable screen, such as a substantially cylindrical rotatable screen, adapted to be at least partially submerged in a body of water. A water supply conduit communicates with the interior of the screen to receive the water flowing therethrough. Backwashing means associated with the screen, such as means to project jets of water, direct water jets at a section or segment of the screen as that section or segment moves the backwashing means. The jets of water serve to clear and/or remove objects or fish caught on the outside of the screen. Duct means are also provided associated with the screen and the backwashing means to provide a flow channel for the objects or fish removed from the screen by the backwashing means. The duct means are dimensioned and positioned so as to carry objects or fish removed from the screen beyond the pull or suction of the water entering the screen.

Other water intake devices or water filtering devices are disclosed in U.S. Pat. Nos. 630,769, 682,994, 788,511, 1,109,385, 1,516,693, 2,022,336, 2,223,104, 2,901,113, 3,333,700, 3,349,916 and 3,843,520. The disclosures of these patents are herein incorporated and made part of this disclosure. However, the prior art and none of these patents discloses the subject invention, i.e. a movable screen provided with backwashing means and duct means associated therewith to remove backwashed material or fish from the pull of or suction of the water entering the screen to the water supply conduit.

It is an object of this invention to provide a water intake device for supplying water for use in the operation of power plants and other installations which require a large volume of water.

It is also an object of this invention to provide a water intake device provided with a screen wherein the screen is continuously cleaned and objects and fish cleared therefrom will not immediately be returned to the screen but are directed away from the screen.

In at least one embodiment of the practices of this invention at least one of the foregoing objects will be achieved. How these and other objects of this invention are achieved will become apparent in the light of the accompanying disclosure made with reference to the accompanying drawings wherein:

FIG. 3 is a top view of another embodiment of a water intake device of this invention;

FIG. 4 is a fragmentary top view of another embodiment of a water intake device of this invention; and FIG. 5 is a cross sectional view of still another embodiment of the water intake device of this invention.

In the drawings the same reference numerals are employed to identify or describe the same or equivalent elements.

DETAILED DESCRIPTION

Figure 1:
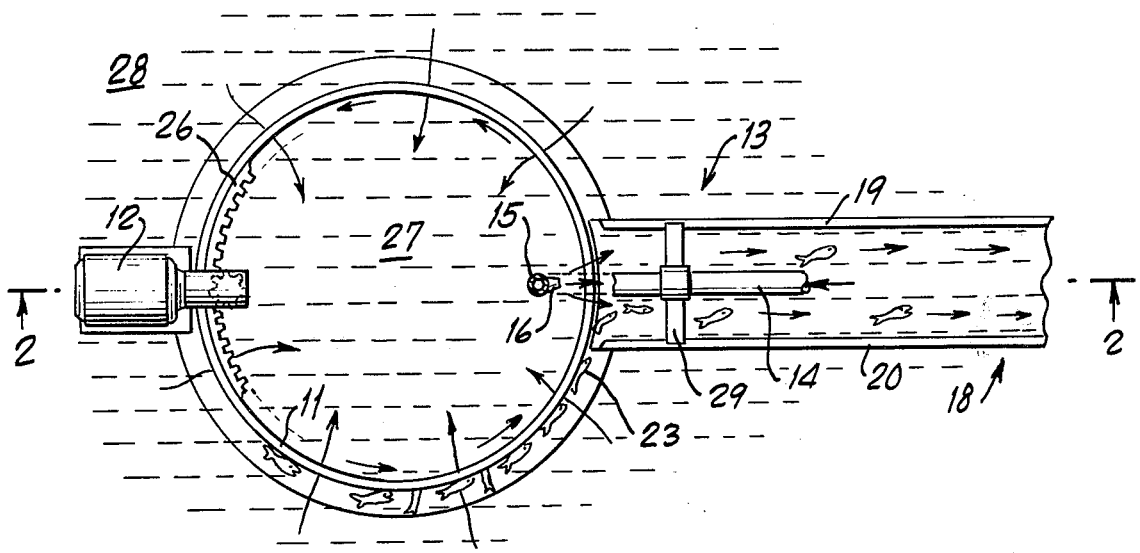
FIG. 1 is a top view of a water intake device embodying the subject invention.
Figure 2:
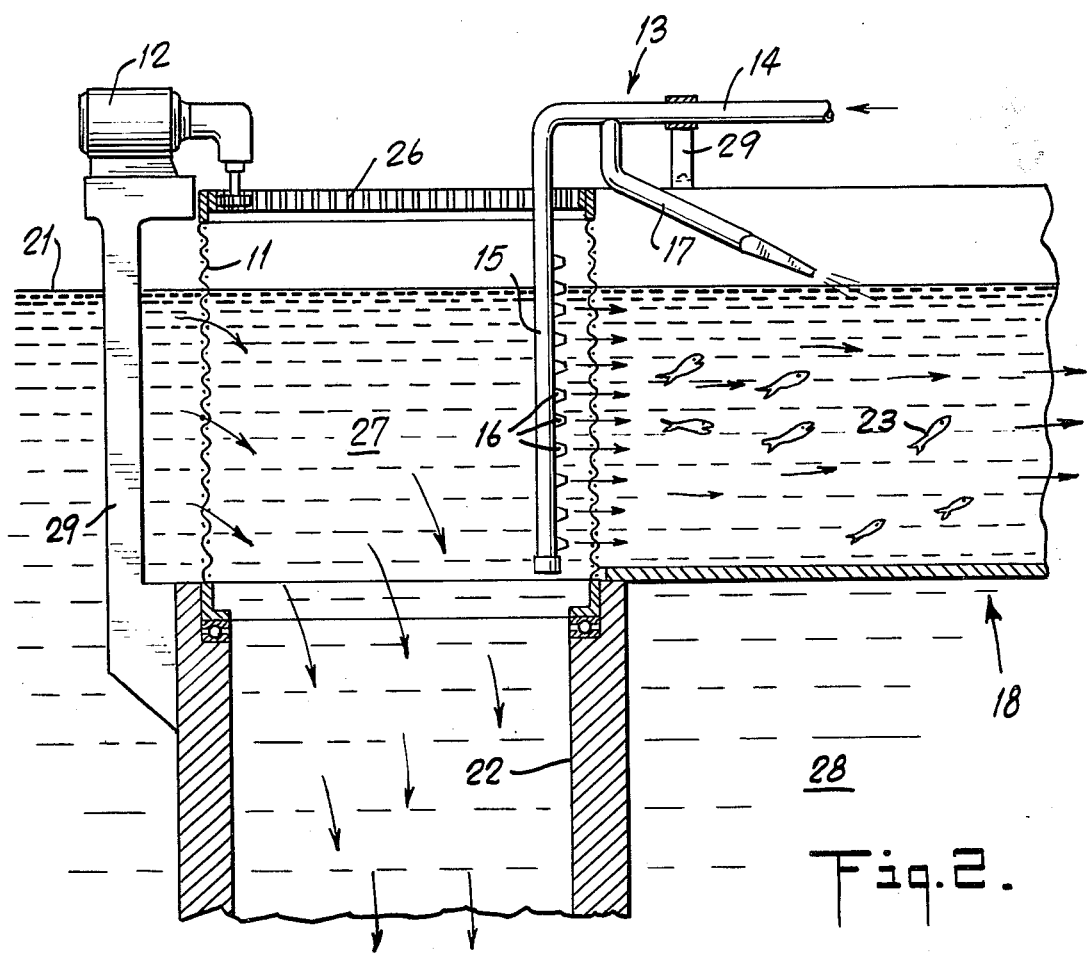
FIG. 2 is a sectional view of the water intake device taken along line 2—2 of FIG. 1.

FIGS. 1 and 2 show a water intake device of the subject invention. Water supply conduit 22 takes in water which can then be used in any desired fashion, such as a coolant in power plant operation. This water is desirably free of objects, including small fish 23, which can interfere with operation of the plants in which the water is used. In addition, if fish 23 are pulled into the machinery of the plants or entrapped by impingement on the screen of the water intake device, the fish will be killed.

Conduit 22 receives water from interior 27 of screen 11, which is illustrated as a substantially cylindrical screen. The mesh of screen 11 allows water to enter but prevents entry of small fish 23 and debris or other objects of a size greater than the screen opening. Thus, fish 23 tend to get caught, such as by impingement, on screen 11, as illustrated.

To prevent screen 11 from becoming clogged with fish 23 and debris and to release fish 23 entrapped by impingement on screen 11, backwashing means, generally indicated by reference numeral 13, is associate with screen 11. Backwashing means 13 is provided with nozzles 16 on flush pipe 15 to direct water jets against the inside of a full length section or segment of screen 11 and clear fish 23 and debris caught on the outside of screen 11. Screen 11 rotates continuously or intermittently so that successive sections of screen 11 face flushing unit 13 and are cleared of fish 23, etc. Duct means 18 serves to prevent fish 23 and debris from being sucked back onto screen 11 as water is taken by intake conduit 22 from interior 27 of screen 11. Duct means 18 direct and tend to guide fish 23 flushed off screen 11 to a location wherein the suction of the water entering conduit 22 will not pull them back onto screen 11.

Referring to the embodiment shown in FIGS. 1 and 2 with attention to details of construction, there is illustrated a substantially cylindrical rotatable screen 11, at least partially submerged in body 28 of water. Screen 11 is rotated by electric motor 12 through gears 26 provided on the upper edge or end of screen 11. Motor 12 is supported on stand 29. It is within the scope of this invention for screen 11 to be rotated by any suitable means or force, such as by the flow of water and/or air.

Screen 11 may be provided with a cover (not shown) to prevent debris and fish 23 from entering interior 27 of screen 11 and intake conduit 22 through the top of screen 11 when screen 11 is fully submerged. When a cover is provided in screen 11, the water supplied flushing unit 13 via conduit 14 desirably enters screen 11 at the center of the cover and screen 11.

Conduit 22 receiving water from the interior of screen 11 is illustrated as located at the bottom of screen 11 in the embodiment shown in FIGS. 1 and 2. This is but one embodiment of the invention. Conduit 22 communicates with interior 27 of screen 11 usually, as illustrated, at the bottom of screen 11 and receives the full flow of water entering interior 27 of screen 11. As indicated hereinabove, although the water intake device of FIGS. 1 and 2 is shown only partially underwater, it can be entirely underwater as described hereinafter.

Flushing or backwashing means 13 is supported by an extension of stand 29 and comprises feedpipe 14 for supplying water to pipe 17 and to pipe 15 on which nozzles 16 are located. Nozzles 16 direct water jets against the interior of screen 11 as screen 11 moves nozzles 16. The water jets clear fish 23 and other debris off the exterior of screen 11 toward and into duct means 18 located opposite flushing unit 13 and composed of walls 19 and 20 which serve to define a flow path for and guide fish 23 and debris cleared from the outside of screen 11. Duct means 18 may be open and/or closed at the top or bottom thereof. Duct means 18 primarily serves to move and guide fish 23 and debris away from screen 11 and the suction effect of the water flowing into conduit 22. Pipe 17 of flushing unit 13 provides a supplemental flow of water to duct means 18. This supplemental flow of water, combined with the water from the jets of nozzles 16, aids in the removal and transport of fish 23 and debris through duct means 18 away from screen 11.

FIG. 3 is a top view of a water intake device embodying the invention provided with two flushing units 13 and two duct means 18. In this embodiment fish 23 can be cleared from screen 11 at two locations. One or both flushing units 13 may be operated continuously, intermittently or alternately, as desired, or depending on other circumstances, such as tidal flow in the surrounding body 28 of water or amount of fish 23 and debris to be cleared off screen 11. As indicated in this embodiment screen 11 is quickly cleared.

FIG. 4 shows a preferred embodiment of the invention. Baffle plate 31 is associated with and positioned around and along nozzles 16 and extending the length of screen 11. Flange plates 32 and 33 of duct means 18 project or extend from walls 19 and 20, respectively, of duct means 18 and like baffle plate 31 along the length of screen 11. Optionally, there may be only baffle plate 31 and no plates 32 and 33. Baffle plate 31 and cooperating flange plates 32 and 33 tend to isolate water in duct means 18 from the influence of the flow of water within the interior of screen 11 into water supply conduit 22. As shown in FIG. 4 there is provided sufficient space between flange plates 32 and 33 and screen 11 to accommodate fish 23 therebetween so that the fish are not crushed but move on screen 11 towards the water jets from nozzles 16 to be cleared from screen 11, as illustrated. However, plates 32 and 33 are desirably close enough to baffle 31 to effectively isolate the flow of water from nozzles 16 and the water flowing into the interior 27 of screen 11. Also, baffle 31 is positioned close to screen 11. The combination of baffle 31 and flange plates 32 and 33 tends, accordingly, to isolate the water flow in duct means 18 from the water flow in interior 27 of screen 11. Brush or squeegee-like member 34 is provided to further isolate this flow. Brush 34 will merely pass over and/or help release but not harm small fish 23.

FIG. 5 shows another embodiment of the invention with the entire water intake device below water level 21. When the water intake device is positioned below water level it will less likely be affected by ice and large debris, such as logs, floating on surface 21 of the water. Screen 11 is positioned with its longitudinal axis in a horizontal plane instead of being upright as shown in FIGS. 1 and 2. In fact, screen 11 may be intermediate any position from being upright as in FIG. 1, to being horizontal as in FIG. 5.

In FIG. 5 submerged motor and pump unit 34 is shown associated with flushing unit 13 for pumping water into flushing unit 13, comprising pipe 15 and nozzles 16. Closed duct means 18 is positioned below screen 11 and water intake conduit 22 is in communication with the open end of screen 11. The other end of screen 11 is closed by stand or support 29. Motor unit 12 is provided to rotate screen 11 past flushing unit 13.

A number of water intake devices embodying the present invention may be used to provide water for one or more installations.

As will be apparent to those skilled in the art in the light of the foregoing disclosure, many modifications, alterations and substitutions are possible in the practice of this invention without departing from the spirit or scope thereof.

I claim:
1. A water intake device comprising:
   (a) a movable foraminous member adapted to be at least partially submerged in a body of water;
   (b) means for moving said foraminous member;
   (c) a water supply conduit to receive water flowing through said foraminous member;
   (d) backwashing means provided associated with said foraminous member for backwashing a section of said foraminous member as said foraminous member moves past said backwashing means so as to clear and/or remove objects or fish caught on said foraminous member;
   (e) duct means associated with said backwashing means and on the other side of said foraminous member from said backwashing means to remove objects or fish removed from said foraminous member or screen by said backwashing means and to provide a flow channel or path for said objects or fish to move away from said foraminous member, said duct means being adapted to be at least partially submerged in said body of water; and
   (f) conduit means of sufficient dimension to provide a stream of water of sufficient force, directed away from said foraminous member within said duct means, to carry said objects or fish removed by said back washing means away from said foraminous member.

2. A water intake device in accordance with claim 1 wherein said foraminous member is a rotatable cylindrical screen and wherein said means for moving said foraminous member comprises means for rotating said screen.

3. A water intake device in accordance with claim 1 wherein said duct means comprises a closed conduit extending substantially radially from said foraminous member.

4. A water intake device in accordance with claim 1 wherein duct means comprise a trough extending substantially radially from said foraminous member.

5. A water intake device in accordance with claim 1 comprising a plurality of backwashing means and associated duct means.

6. A water intake device in accordance with claim 1 comprising two backwashing means and two associated duct means, the two backwashing means and associated duct means being disposed substantially 180° relative to each other.

7. A water intake device in accordance with claim 1 wherein a baffle plate is associated with said backwashing means and extends along said section of said foraminous member opposite said duct means to hinder the flow of water from said duct means through said foraminous member to said water supply conduit.

8. A water intake device in accordance with claim 1 wherein said foraminous member and said duct means are adapted and positioned completely below the level of said body of water.

9. A water intake device in accordance with claim 1 wherein said foraminous member is a rotatable substantially vertically positioned cylindrical screen and means are provided for rotating said screen.

10. A water intake device in accordance with claim 1 wherein said foraminous member is a rotatable substantially horizontally positioned cylindrical screen and means are provided for rotating said screen.

11. A water intake device in accordance with claim 1 wherein a baffle plate is associated with said backwashing means and extends along said section of said foraminous member opposite said duct means to hinder flow of water from said duct means through said foraminous member to said water supply conduit and wherein said duct means is provided with flange plates extending along the outside of said foraminous member opposite said backwashing means and said baffle plate and substantially coextensive with said baffle plate.

12. A water intake device in accordance with claim 11 wherein squeegee means are provided on the ends of said flange plates.

13. A water intake device in accordance with claim 1 wherein said duct means comprises a trough defined by two substantially vertically positioned side plates.

14. A water intake device in accordance with claim 13 wherein said duct means is open at the top.

15. A water intake device in accordance with claim 13 wherein said duct means is closed at the top and bottom.

16. A water intake device in accordance with claim 13 wherein said duct means is open at the bottom and closed at the top.

17. In an operation wherein water is taken into a water intake, the water intake being provided with a screen to remove solid material, such as debris and live fish, from the water taken into the intake, the improvement which comprises backwashing said screen to clear solid material, such as debris and live fish and the like, from the screen, moving said solid material cleared from said screen into a path away from said screen and the infuence of the water entering said screen, and directing a stream of water of sufficient force, along said path and onto said solid material cleared from said screen in order to move said material cleared from said screen by said backwashing away from said screen.

* * * * *